Nov. 8, 1932. H. E. P. BRACEY 1,886,373
INSECTPROOF JAM JAR AND OTHER FOOD CONTAINER
Filed April 11, 1929
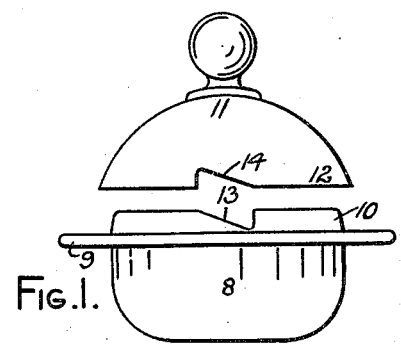
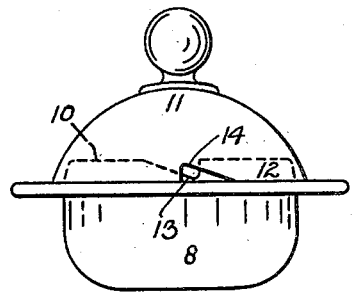
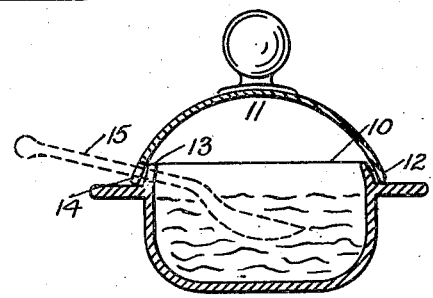
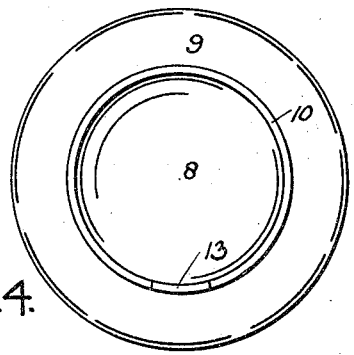
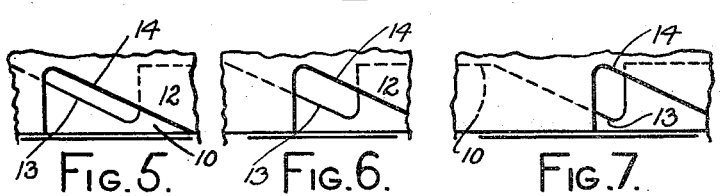
INVENTOR
HORACE E. P. BRACEY Patented Nov. 8, 1932

1,886,373

UNITED STATES PATENT OFFICE

HORACE EDWARD PEARCE BRACEY, OF LITHGOW, NEW SOUTH WALES, AUSTRALIA

INSECTPROOF JAM JAR AND OTHER FOOD CONTAINER

Application filed April 11, 1929, Serial No. 354,394, and in Australia April 26, 1928.

Heretofore in a honey pot, butter dish, jam jar or other food stuff container of usual construction, it has been found difficult to leave a spoon or other serving implements in the food stuff with the lid or cover replaced, and at the same time exclude flies, and other insect pests from entry into the said food stuff. Now this invention has been specially devised to provide cheap, simple, and durable means whereby the above mentioned disability is obviated, and a spoon or the like serving implement having a handle of any desired contour and cross section, may be left in the foodstuff with said handle projecting from the container with the lid or cover firmly seating in position and not tilted, and thus an adjustable insect-tight joint is preserved around said projecting handle.

According to this invention the jam jar, or other foodstuff container is of more or less usual shape, and ornamented as desired, and having a circular rim or flange around the mouth or open top, and a cover or lid with complementary rim or flange inwardly or outwardly of that of the said container. Now the rim or flange of the container has an angular, or ramp, or wedge shaped step or slot formed therein and the cover or lid has a similar but oppositely formed step or slot provided in its rim flange, and as the two said steps or slots are juxtaposed and one revolved past the other an orifice of varying shape and size is provided therethrough and is thus adjustable to suit different shapes and sizes of spoons or other serving implements.

In order to more fully describe this invention reference will be made to the annexed drawing wherein:—

Fig. 1 is a side elevation of a jam jar in which this invention is incorporated, and showing the cover raised.

Fig. 2 is a similar view of Fig. 1 but with the cover in position.

Fig. 3 is a transverse section of Fig. 2.

Fig. 4 is a plan of the container with cover removed.

Figs. 5, 6 and 7 are enlarged details showing the steps or slots adjusted to different sizes.

The jam jar 8 shown is of glass or any other suitable material and of usual construction having a side flange 9 and a mouth rim 10, and a cover 11 (with rim 12) is provided. The mouth rim 10 has a step or slot 13 of ramp formation (the preferred shape) formed therein leading inwardly from the edge, and this may be conveniently formed by grinding on one edge of an emery wheel or other suitable grinding wheel.

The rim 12 of the cover 11 has a similar step or slot 14 formed therein but in the reverse direction to 13.

In use when the cover 11 is placed on the jar 8 with the steps or slots 13 and 14 opposite, a rectangular opening or orifice is provided to the contents of said jar 8 and through which the handle 15 of a spoon 16 (see Fig. 3) may pass; and as the said cover 11 is revolved upon said jar 8 the opening enlarges or reduces according to the direction of movement, (see Figs. 5, 6, and 7) and thus adapts itself to various shapes and sizes of spoon handles and closely surrounds or abuts same and preserves an insect proof joint therearound.

It is to be understood that although only one application of this invention has been shown and described, the scope thereof is not limited thereby, as the invention may be applied in many ways, and varied to suit different requirements.

I claim:—

1. A container comprising a bottom portion and a cover, said bottom portion and cover having cooperating rims thereon, one of said rims having a wedge-shaped notch formed therein and the other of said rims having a similar but reversed notch formed therein whereby upon relative rotation of said bottom portion and said cover an orifice of progressively varying size and shape is formed therebetween.

2. A container comprising a bottom portion and cover, said cover having formed therein a notch of progressively increasing depth and said bottom portion having a similar but reversed notch formed therein whereby relative rotation of said cover and bottom portion produces an orifice of progressively varying size and shape therebetween.

3. A container comprising a bottom portion and a cover portion, said bottom portion having a projecting annular flange somewhat below the rim thereof to form a seating for said cover portion, the said rim being formed with a recess therein and the edge of the said cover portion being formed with a recess therein whereby upon rotation of the said cover portion upon said seating the said recesses co-operate to form an orifice of progressively varying size therebetween.

4. A container comprising a top portion and a bottom portion, each having a notch therein, said notches co-operating to form, upon relative rotation of said portions, an opening of a size progressively varying in all directions.

HORACE EDWARD PEARCE BRACEY.